(12) United States Patent
Lekkalapudi et al.

(10) Patent No.: US 9,118,538 B1
(45) Date of Patent: Aug. 25, 2015

(54) METHOD AND SYSTEM FOR CONFIGURING RESOURCES TO ENABLE RESOURCE MONITORING

(71) Applicant: EMC Corporation, Hopkinton, MA (US)

(72) Inventors: Chaithanya Lekkalapudi, Palamaner (IN); Alex Rankov, Danville, CA (US); Alexey Nikulin, Kharkiv (UA); Ilya Khudoshin, Kharkiv (UA); Sameer Mukund Kachare, Dublin, CA (US)

(73) Assignee: EMC Corporation, Hopkinton, MA (US)

( * ) Notice: Subject to any disclaimer, the term of this patent is extended or adjusted under 35 U.S.C. 154(b) by 244 days.

(21) Appl. No.: 13/833,499

(22) Filed: Mar. 15, 2013

(51) Int. Cl.
   *H04L 12/26* (2006.01)
   *H04L 29/08* (2006.01)
(52) U.S. Cl.
   CPC .............. *H04L 43/00* (2013.01); *H04L 67/025* (2013.01)
(58) Field of Classification Search
   None
   See application file for complete search history.

(56) References Cited

U.S. PATENT DOCUMENTS

| | | | |
|---|---|---|---|
| 2004/0158575 A1* | 8/2004 | Jacquemot et al. | 707/102 |
| 2010/0325624 A1* | 12/2010 | Bartolo et al. | 717/176 |
| 2012/0331113 A1* | 12/2012 | Jain et al. | 709/220 |
| 2013/0227712 A1* | 8/2013 | Salem et al. | 726/30 |
| 2014/0047341 A1* | 2/2014 | Breternitz et al. | 715/735 |
| 2014/0173060 A1* | 6/2014 | Jubran et al. | 709/220 |

* cited by examiner

*Primary Examiner* — Nicholas Taylor
*Assistant Examiner* — Clayton R Williams
(74) *Attorney, Agent, or Firm* — Dergosits & Noah LLP; Todd A. Noah

(57) ABSTRACT

Systems and methods are provided for automatically configuring resources of a deployment environment so that the resources can be monitored by a resource monitoring program. In an implementation, a blueprint having a representation of a deployment topology of the environment is received. A resource template that specifies an inventory model of the resource monitoring program is received. Resources listed in the blueprint are configured according the inventory model specified in the template, thereby allowing the resources to be monitored by the resource monitoring program.

20 Claims, 10 Drawing Sheets

Figure 9

METHOD AND SYSTEM FOR CONFIGURING RESOURCES TO ENABLE RESOURCE MONITORING

BACKGROUND

The present invention relates to the field of information technology, including, more particularly, to systems and techniques for monitoring resources.

A properly functioning software application is critical in today's age of information. Businesses rely on document management applications, order fulfillment applications, customer relationship management (CRM) applications, supply chain management applications, human resources (HR) applications, flight scheduling applications, and much more to help support customers, clients, salespersons, vendors, and employees. End-users have come to expect that applications and services will be available around the clock, 24×7.

Monitoring applications are available to help monitor the computing resources used to support such applications. However, configuring the resources so that they can be monitored by the monitoring application is a lengthy and time-consuming process. Thus, there is a need to provide systems and techniques to reduce the burden required for configuring resources for monitoring.

BRIEF DESCRIPTION OF THE FIGURES

FIG. 9 shows an example of a graphical user interface listing configuration options.

DETAILED DESCRIPTION

Figure 1:
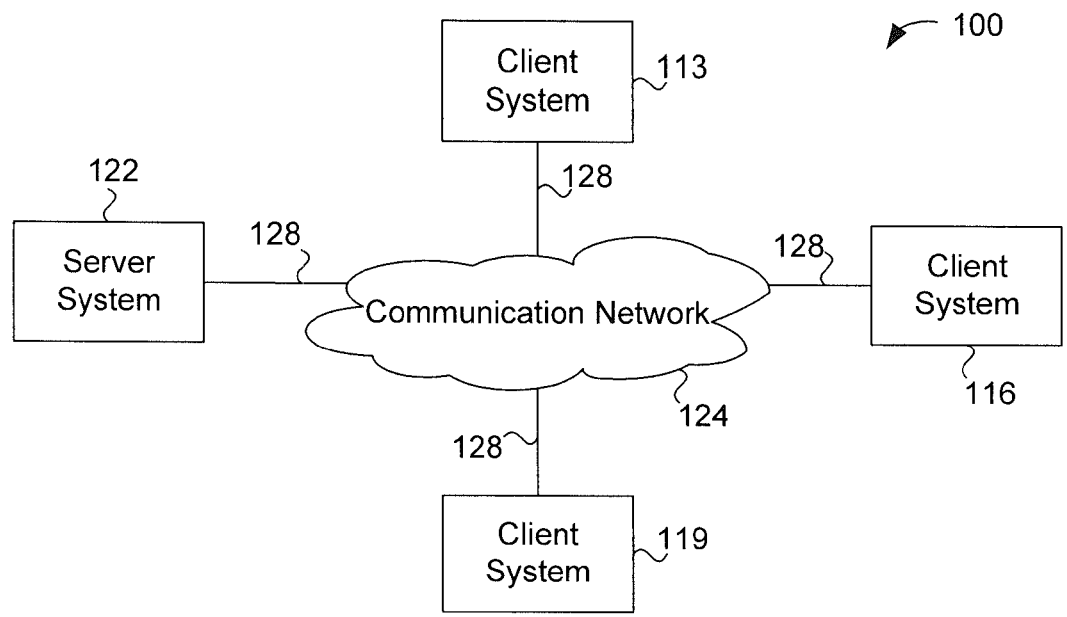
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
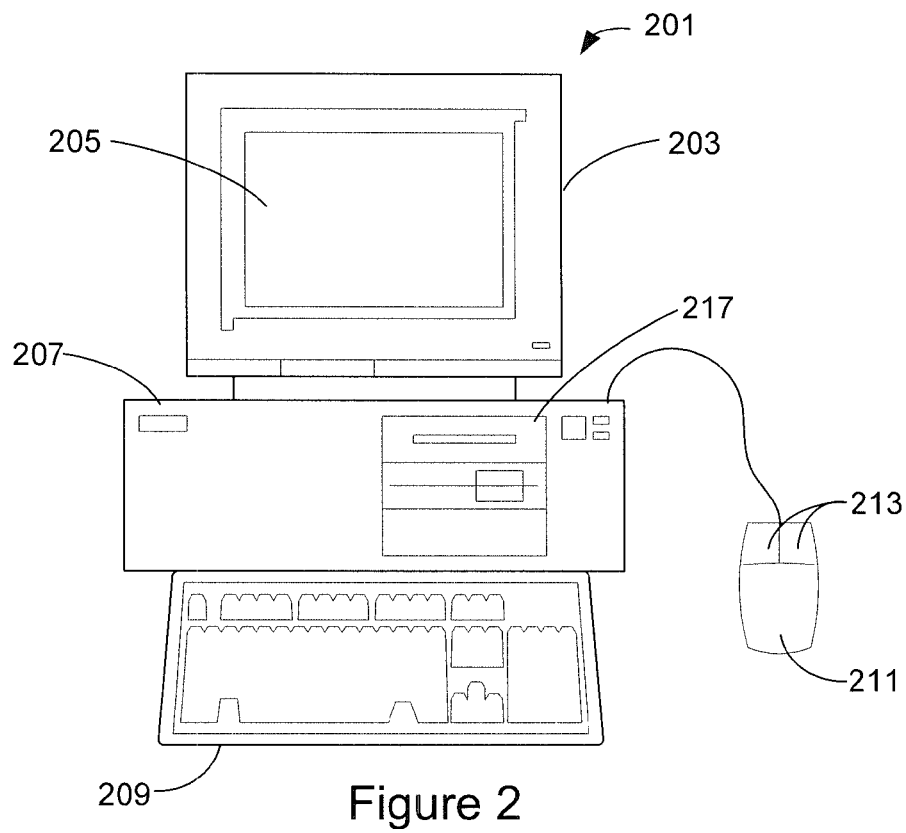
FIG. 2 shows a more detailed diagram of an example of a client or computer which may be used in an implementation of the invention.

FIG. 2 shows an example of a client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
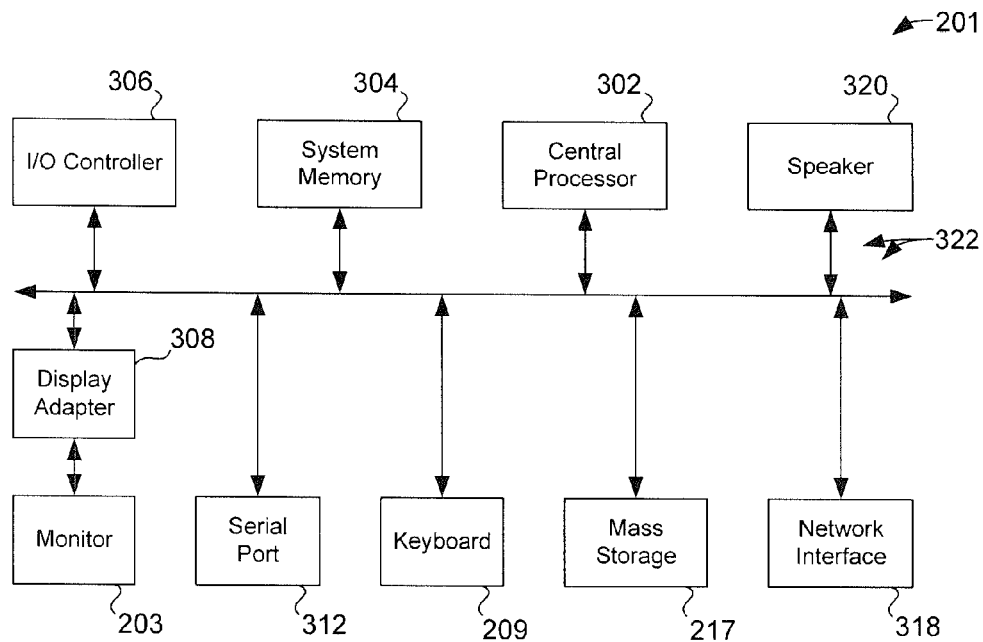
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®, Windows 8), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
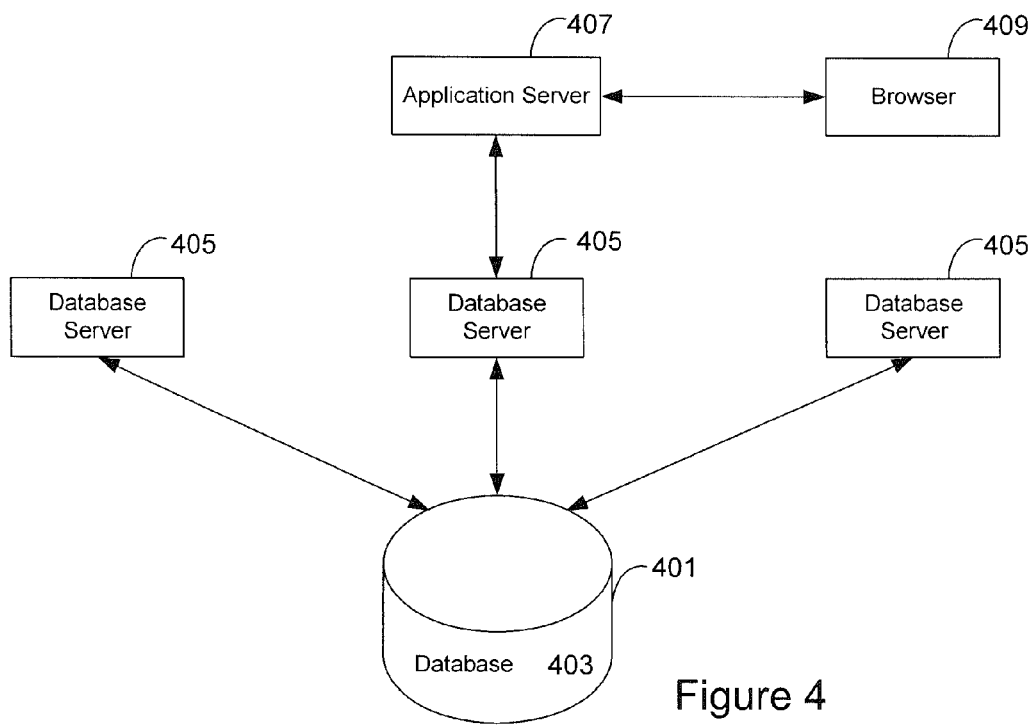
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
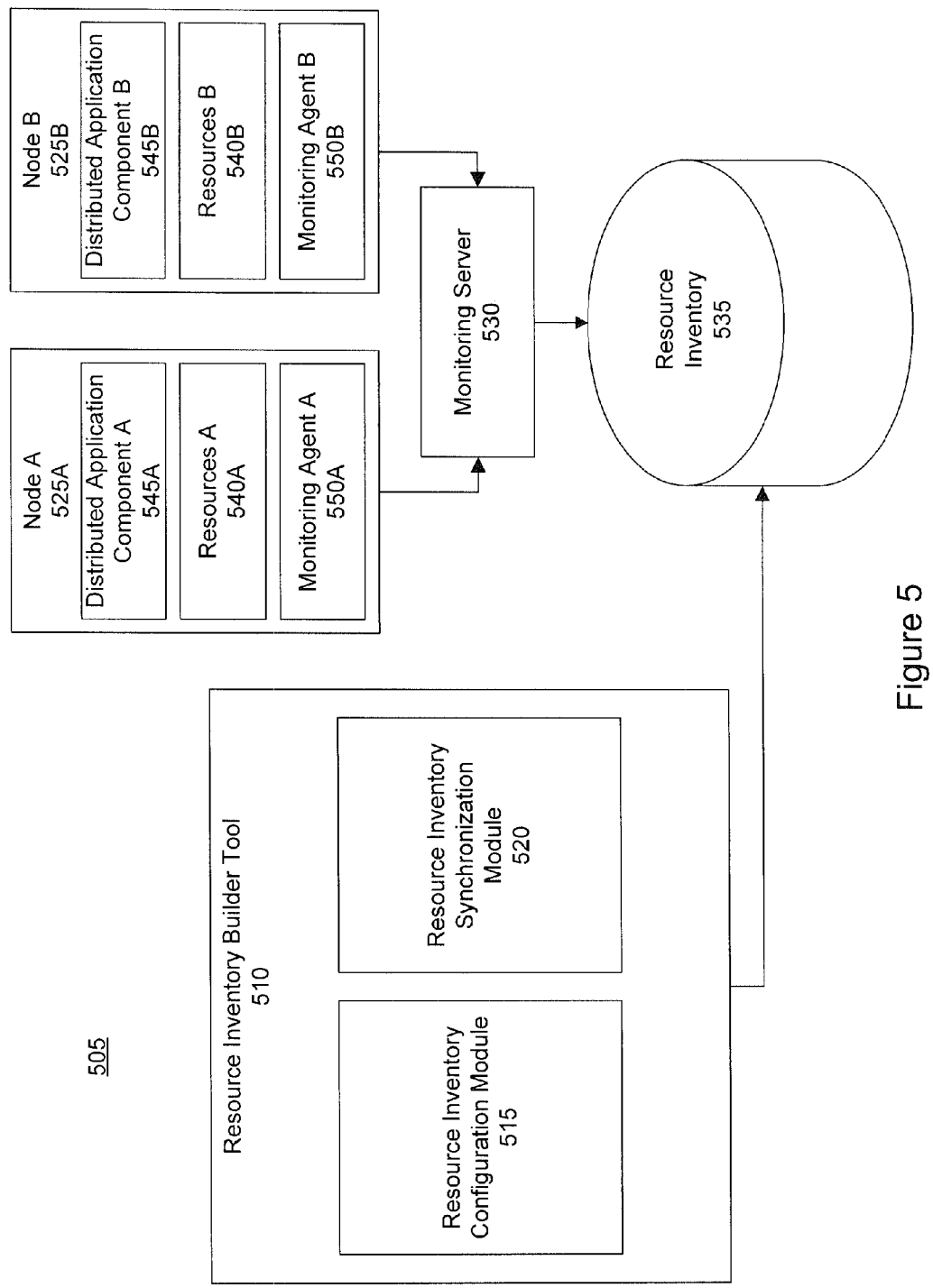
FIG. 5 shows a block diagram of an example of a tool for configuring resources for monitoring.

FIG. 5 shows block diagram of a computing environment 505 having a system for configuring computing resources. In a specific implementation, the system configures the resources so that the resources can be monitored by a monitoring application. The system includes a resource inventory builder tool 510 including a resource inventory configuration module 515, and a resource inventory synchronization module 520. This example of the computing environment includes computing nodes 525A and 525B, a monitoring server 530, and a resource inventory 535.

The computing nodes can be physical machines or virtual machines. The computing nodes provide resources to support the execution of a distributed application. For example, node 525A includes a set of resources 540A to support execution of a distributed application component 545A. Node 525B includes a set of resources 540B to support execution of a distributed application component 545B. A monitoring agent 550A on node 525A monitors the distributed application's use of resources 540A. A monitoring agent 550B on node 525B monitors the distributed application's use of resources 540B. The monitoring server collects from the monitoring agents information about the health, status, and performance of the resources. Resource monitoring helps to ensure the reliability of the distributed application. In an implementation, the monitoring agents, monitoring server, and resource inventory are components of the monitoring application.

Although the figure shows two nodes, it should be appreciated that there can be any number of nodes. For example, there can be tens, hundreds, or even thousands of nodes. The distributed application program can include multiple components or parts that are on different virtual machines. The different virtual machines can be on the same or different hardware platform.

In a specific implementation, the distributed application program is Documentum and the monitoring application program is Hyperic, both of which are provided by EMC Corporation of Hopkinton, Mass. Documentum is an enterprise content management platform. Some features of Documentum include document management, collaboration, search, content classification, business process management, and Web content management. The Hyperic product provides application monitoring and performance management for physical, virtual, and cloud environments. Hyperic provides monitoring and management infrastructure for monitoring wide variety of software resources running on physical or virtual environments. Hyperic can provide a single shot view of status regarding various resources running in the environments monitored by the Hyperic infrastructure for environment administrators. It should be appreciated, however, that aspects of the invention can be applicable to any type of monitoring program and any type of distributed application (e.g., customer relationship management (CRM) systems, electronic health record (EHR) systems, human resources (HR) systems, inventory tracking systems, and so forth).

Given the dynamism of cloud based deployments, monitoring resources continuously for availability and performance is quite important for any cloud based deployment to be successful. Monitoring systems not only help administrators to identify the issues as early as possible, but also help them to properly plan and manage the resource allocation to various resources by giving the snapshot resource consumption over a period of time.

In a specific implementation, the tool is embodied in a product referred to as xClerated Management System (xMS) by EMC. xMS provides a way for configuring the deployment environments for monitoring with Hyperic in an automated fashion using Blueprint driven Hyperic Inventory synchronization service, as a part of the environment provisioning process. Some monitoring systems such as Hyperic manage their own resource inventory. It may be necessary for the inventory to include details regarding the resource, type of resource, configuration parameters associated with the resource, and so forth. Monitoring systems use this data to schedule the metric (e.g., performance, or availability) collection. Proper configuration of resources for monitoring in monitoring systems inventory like Hyperic is important for successful monitoring of any resource.

In this specific implementation, xMS reduces the deployment complexity by automating the installation and configuration of the Documentum product stack on a vSphere/vCloud infrastructure (cloud infrastructure), which is also provided by EMC. xMS can configure the deployment environment for monitoring with Hyperic. xMS configures deployment environments for monitoring with Hyperic in an automated fashion. Environment provisioning refers to a process where the software components will be configured as per input configuration parameters, so that software components start functioning by rendering services thru the respective end points. In this specific implementation, an xMS provisioned environment or an xMS provisioned deployment environment represents the deployment environments that have been provisioned using xMS based on the blueprint provided as input.

Though some monitoring systems like Hyperic provide a way for auto discovering the resources, it is observed that the auto discovery process happens in an asynchronous fashion. Further, even auto discovered resources can require manual intervention for properly configuring the same for monitoring by supplying the values for configuration parameters. This patent application describes a mechanism that, in a specific implementation, takes away the responsibility of configuration of resources associated with xMS provisioned environments based on the blueprint configuration and ensures that the Hyperic inventory is in sync (e.g., synchronized, matches, or corresponds) with the blueprint or deployment topology over the life time of an xMS provisioned deployment environment.

In a specific implementation, resource inventory 535 stores a listing of the resources available for the distributed application program. Resources can include, for example, operating systems, application servers, database servers, Web servers, messaging servers, authentication servers, application components, services (e.g., Web services, or virtualization services), databases, and other software components. The resource inventory may be referred to as a catalog.

Resource inventory builder tool 510 is responsible for creating, configuring, and maintaining the resource listing stored in the resource inventory according to an inventory model specified by the application monitoring program. The tool and modules are functional entities where the implementation can vary from platform to platform and application to application. In some cases, the configuration and synchronization modules are combined into one code module. In other cases, the configuration and synchronization modules reside in separate code modules.

Configuring resources can include organizing the resources in an inventory, setting metrics for monitoring the resources, or both. Some application monitoring products, such as Hyperic, specify an inventory model that categorizes software and network resources into a hierarchy of types. An application monitoring product may require that the resources be configured according to the inventory model in order for the resources to be monitored. Typically, such configuration is performed manually. As a result, configuring the resources for monitoring can be a very lengthy and time-consuming process. It is desirable to provide more efficient techniques for configuring resources for monitoring.

In a specific implementation, the tool is capable of configuring the resources so that the resources can be monitored by the monitoring application after the resources have been provisioned in the computing environment. For example, the resources may be supporting the execution of the distributed application program, but the resources may not yet be configured for monitoring by the monitoring application program. The tool can then be installed, run, or activated so that the resources are configured for monitoring.

That is, the resources may be categorized, grouped, organized, structured, arranged, matched, or classified according to the inventory model of the monitoring application program; associated with metrics of the monitoring application program; defined, created, or specified in an inventory of monitoring application program; or combinations of these— after the computing environment has been established (e.g., after the resource have been allocated, or after the distributed application has been deployed). Resource monitoring can be implemented retroactively or while the resources are supporting the execution of the distributed application. Allowing resource monitoring to be implemented retroactively can be advantageous because it helps to reduce application downtime associated with implementing resource monitoring. Administrators can use the tool to implement resource monitoring in an existing environment. Alternatively, in another specific implementation, configuring resources for monitoring may be performed in conjunction with the initial provisioning of the environment for the distributed application program.

In a specific embodiment, an inventory model provides for classifying a resource as an inventory type and as a resource type. An inventory type may relate to a software dependency hierarchy including platform, server, and service. Groups and applications are examples of inventory types. A resource type may relate to the "brand" or vendor associated with a resource. In other words, resources in the inventory can be hierarchically related. A resource can be classified as an inventory type (e.g., platform, server, service, group, or application) and as a resource type that identifies the brand of the inventory type (e.g., a Win32 platform, a JBoss 4.0 server, and so forth).

In this specific embodiment, as specified by the inventory model, a resource's inventory type may be the first level of classification that the monitoring system applies to resources. There may be a resource hierarchy and grouped resources. Regarding the resource hierarchy, several inventory types can be used to identify where a resource fits into a resource hierarchy. Resources may be classified as one of the following inventory types: (1) platform—usually corresponds to a machine running an operating system; (2) server—a software product running on an operating system, for instance a database or application server; or (3) service—an integral component of a platform or server, for instance, a file server mount, database table, or a connection pool.

In this specific embodiment, for grouped resources, there may be two inventory types that correspond to multiple individual resources. Resources can be grouped for a variety of reasons, e.g., to monitor a set of like or related resources in aggregate; to administer or control like resources at the group level instead of individually; or for resource access control. There may be two inventory types that are named sets of other resources: group and application. Thus, in this specific embodiment, "inventory type" may classify a resource as a platform, server, service, group, or application. The term "inventory level" may refer to inventory types that fit into a hierarchical structure—platforms, servers, and services.

In this specific embodiment, the inventory model may require that each individual resource (every resource that is a platform, server, or service) in the inventory has a resource type that indicates what kind of platform, server, or service it is. For example, the resource type of a Windows system (whose inventory type is "platform") may be "Win32"; the resource type of a Linux system (whose inventory type is also platform) may be "Linux." The resource type of a JBoss 4.0 instance (whose inventory type is "server") may be "JBoss 4.0"; the resource type of a WebLogic 9.1 instance (whose inventory type is also server) may be "WebLogic 9.1." The resource type of a Jboss entity EJB (whose inventory type is "service") may be "JBoss 4.0 Entity EJB"; the resource type of a WebLogic EJB (whose inventory type is also service) may be "WebLogic 9.2 Entity EJB." Thus, "resource type" can classify a resource as a particular type of platform, server, or service.

Platforms, servers, and services can be hierarchically related. A platform can be a machine or operating system, with a monitoring agent running on it. There can be platform types for virtual and network hosts. A server can be a software product that runs on a platform. A service can be a resource that is integral to, or runs upon, a platform or server. A service can include a resource at the platform or server level.

Figure 6:
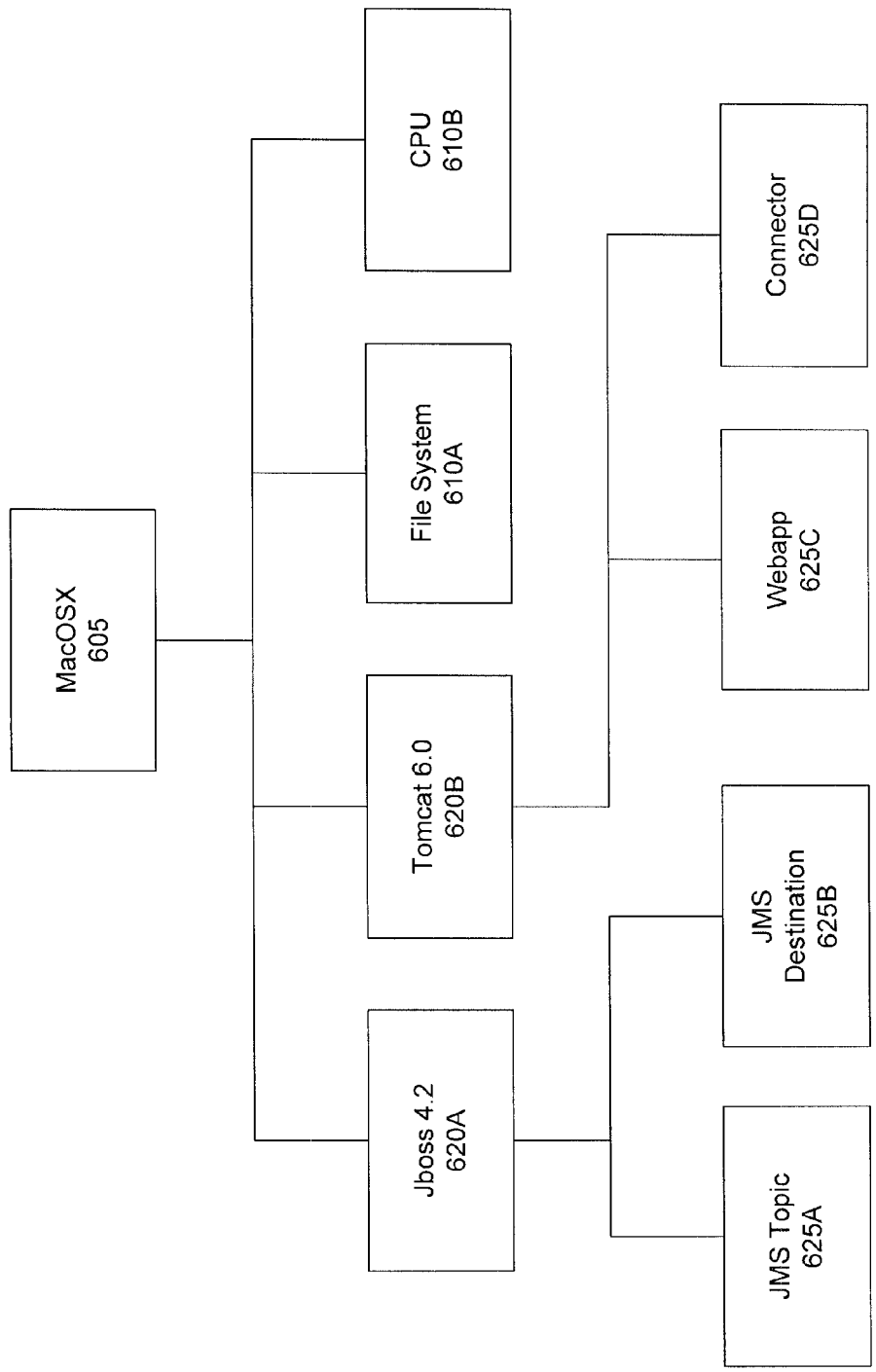
FIG. 6 shows an example of a resource hierarchy.

FIG. 6 shows a graphical view of an example of a resource hierarchy. The diagram shown in FIG. 6 illustrates a specific platform-server-service hierarchy. In the figure, only a subset of the servers and services in the hierarchy are shown for clarity. The label for each resource indicates its type. As shown in the diagram, the hierarchy includes a platform 605 of type "MacOSX," a first platform service 610A of type "File System," a second platform service 610B of type "CPU," a first server 620A of type "JBoss 4.2," a second server 620B of type "Tomcat 6.0," and first, second, third, and fourth services 625A-D (that run in servers) of types "JMS Topic," "JMS Destination," "Webapp," and "Connector," respectively.

There can be two kinds of platforms including operating system platforms, and virtual and network platforms. An operating system platform can be a computer and the operating system that runs on it. Some examples of operating system platform types include AIX, FreeBSD, HPUX, Linux, MacOSX, Solaris, Unix, and Win32. Some platform types (e.g., virtual and network platforms) may not map to an individual physical machine running a traditional operating system. Examples of these resources include resources that an agent monitors remotely over the network, such as for network hosts and devices, virtual resources such as VMware vSphere hosts and virtual machines, and distributed sets of resources, such as GemFire Distributed Systems. Other specific examples of virtual and network platform types include Cisco IOS, Cisco Pixos, GemFire Distributed System, NetApp Filer, Network Device, Network Host, VMware vSphere Host, VMware vSphere VM, and Xen Host.

As discussed above, a server can refer to a software product that runs on a platform. Servers provide a communications interface and perform specific tasks upon request. Examples of server types include Tomcat, JBoss, and Exchange. A service can be a software component dedicated to a particular task that runs on a server or platform. A service that runs on a server can be referred to as a service. A service that runs on a platform can be referred to as a platform service. Examples of key services include CPUs, network interfaces, file systems, and so forth, running on the platform.

In a specific embodiment, the inventory model provides support for groups. A group can be an inventory type that is a collection of other inventory resources. A group can be named set of other inventory resources. Grouping resources can be useful for monitoring a set of homogeneous or related resources in aggregate. Groups can enable role-specific monitoring views, or views that reflect the purpose or business need that the set of resources satisfy. In an environment with thousands of resources, viewing availability and performance data at the group level helps reduces the clutter in the user interface. Grouping can be useful for automating resource operations and control, such as performing control actions on a group of like resources with a single command. Grouping can be useful for controlling access to resources.

There can be a user-configured set of inventory items of the same type, for example "JBoss 4.x" servers, or "Linux" platforms. There can be groups including inventory resources that are of different types. These groups can be referred to as mixed groups. Mixed groups are useful in implementing access control policies—for instance, for a set of resources from the same vendor, or that are hosted for a particular customer. There can be groups including a set of resources of the same type with the same parent resource. Such groups may be referred to as autogroups. An autogroup can be named for the type of resources it contains. For instance, an autogroup that contains the CPUs on a platform may be referred to as "CPU."

In a specific embodiment, an application is an inventory type that is a collection of other inventory resources. The application may be a collection of services that together fulfill a single business purpose. This concept reflects the idea that an application, from the business point of view, comprises many different pieces, and those pieces are usually distributed across different platforms and provided by different servers. This allows for managing the infrastructure from an application—as opposed to a hardware—point of view. In other words, an application can be an inventory type, configured by an authorized user. An application can be a set of selected services, running in different servers on multiple platforms, that together fulfill a single business purpose. Configuring applications allows managing the infrastructure from an application—as opposed to a hardware—perspective.

A significant amount of administration overhead can be spent to configure resources for monitoring. Although some monitoring agents include features to autodiscover resources, Applicants have found that the discovery process can be unreliable and that agents sometimes fail to properly discover the resources. For example, certain resource types may not be discovered, resource changes may not be discovered, or both. In these cases, an administrator may have to configure the resources manually, one at a time. Because manual configuration can be a lengthy and time-consuming process, it is desirable to provide techniques for automatically configuring distributed application deployments for monitoring in the context of a cloud environment.

Figure 7:
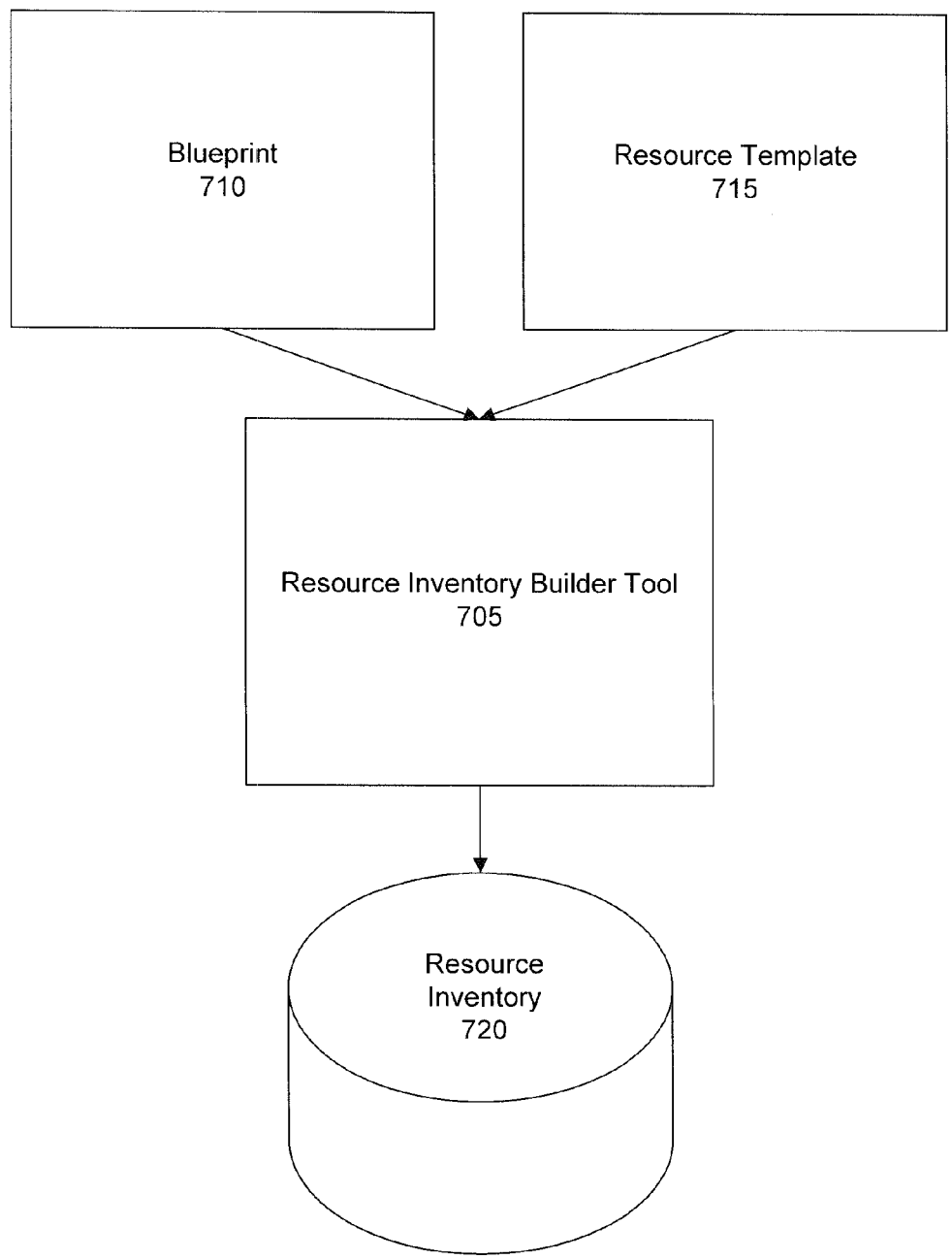
FIG. 7 shows a block diagram of inputs to the tool and an output.

FIG. 7 shows a block diagram of a resource inventory builder tool or software tool 705 that can automatically or without user intervention configure deployment environments for monitoring. In brief, in a specific implementation, the tool receives as input a blueprint 710 and a resource template 715. In this specific implementation, the blueprint is an Extensible Markup Language (XML) formatted file that provides a description or representation of the deployment topology. The resource template is an XML formatted file that includes information for how a specific resource can be represented in a resource inventory 720 of the monitoring system and metrics that should be enabled for the specific resource.

In this specific implementation, XML is selected because the nature of the data represented is hierarchical and XML works well for hierarchical data. In other cases, other or related hierarchical data formats or structures may instead or additionally used such as Standard Generalized Markup Language (SGML), Extensible HyperText Markup Language (XHTML), JavaScript Object Notation (JSON), or combinations of these.

The XML language uses syntax tags to identify various types of data in a file. To define the data model or content of each of the elements a DTD (Document Type Definition) can be used. An element can include a start tag (e.g., "<memory>"), an end tag (e.g., "/<memory>"), and content or data between the start and end tags (e.g., "2 GB"). Elements can be nested. A DTD is one way to define the structure or tree of an XML document. Other examples of XML schemas and XML specifications that may be suitable for use include DCD (Document Content Description), DDML (Document Definition Markup Language), SAX (Simple API for XML), XSCHEMA, XML Namespace, and others. The builder tool may include an XML parser to read the tags in the blueprint and resource template and extract the data. The tool can analyze the information provided in the blueprint and the resource template and create the resource definitions in resource inventory 720.

Figure 8:
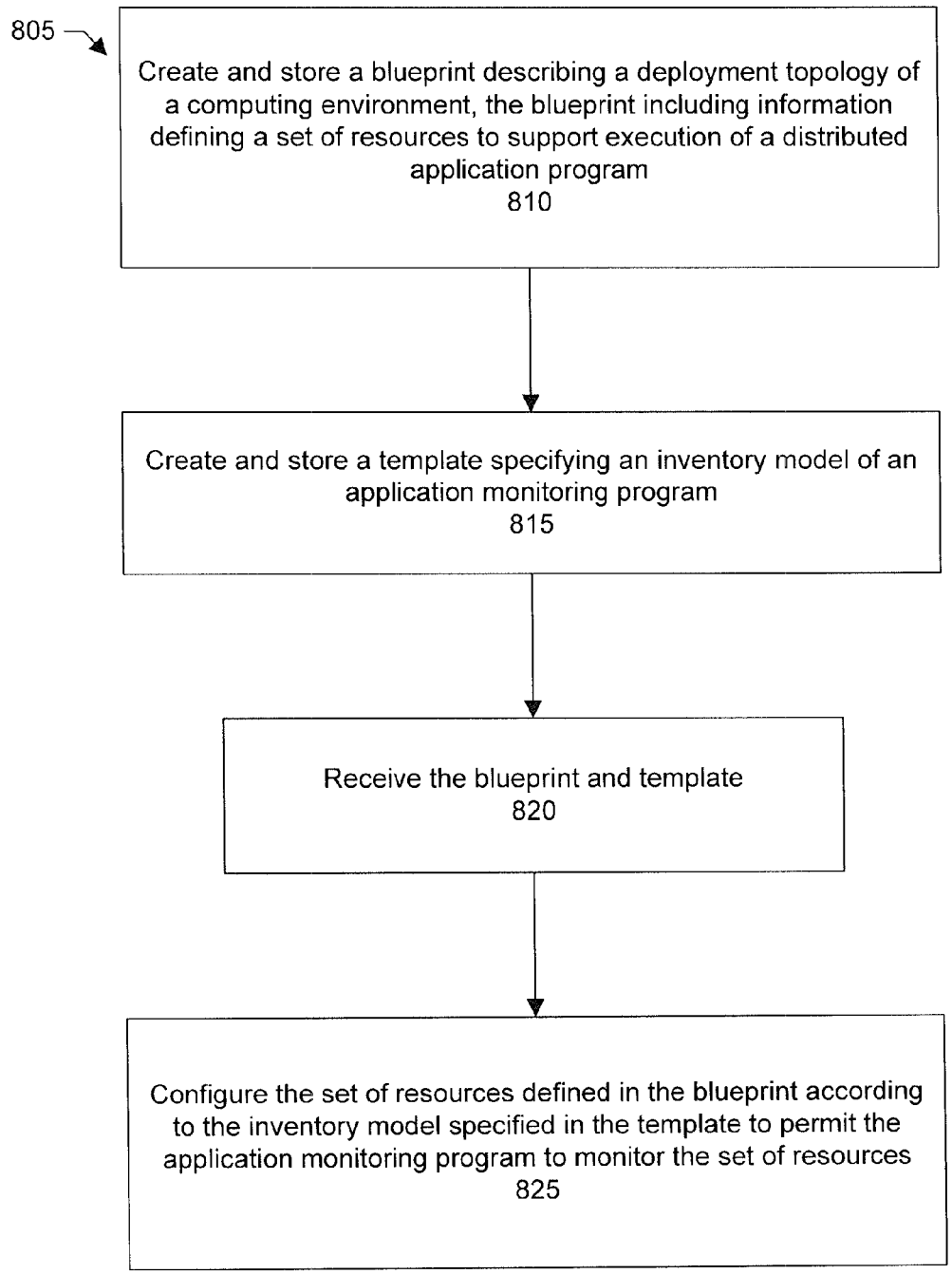
FIG. 8 shows an overall flow of the tool.

FIG. 8 shows an overall flow 805 for using the tool shown in FIG. 7. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 810, a blueprint is created and stored. The blueprint describes and defines a deployment topology of a computing environment. The blueprint can include information defining a set of resources to support execution of a distributed application program. The blueprint can be created by, for example, an administrator. In a specific implementation, the blueprint is an XML representation of deployment topology. The blueprint can include, for example, the number of compute nodes (e.g., physical machines or virtual machines) required, and information describing how software components need to map to compute nodes. Using a blueprint, the administrator user can express the required topology of the environment to be provisioned.

More particularly, a blueprint can include a number of the required compute nodes/resources, information identifying which software components are required as part of a deployment environment, the mapping of software components to compute nodes/resources, configuration options needed for successful installation and configuration of any software component, installation dependencies, the number of virtual machines in the environment, the number of physical machines in the environment, a listing of software components installed on a particular machine, the type of software components installed on a particular machine, the configuration parameters that have been supplied to configure the software components on a particular machine, or combinations of these. That is, the blueprint can capture information regarding the software components installed in the context of the environment including, for example, type of the software components (resources), configuration parameters that define the run time behavior, connectivity details, and access credentials, component dependencies, or combinations of these. Table A below shows an example of a blueprint file.

TABLE A

```
<?xml version="1.0" encoding="UTF-8" standalone="yes"?>
<blueprint key="DCM" name="repository-blueprint">
  <version>
    <name>7.0</name>
  </version>
  <vm-clusters>
    <vm-cluster name="fileServerVM" key="F">
      <size>1</size>
      <cpu>2</cpu>
      <memory>2GB</memory>
      <hdd>30GB</hdd>
      <!--<vm-template nameref="windowsTemplate" /> -->
    </vm-cluster>
    <vm-cluster name="repoVM" affinity="ANTI_AFFINITY" key="R">
```

TABLE A-continued

```
          <size>2</size>
          <cpu>2</cpu>
          <memory>2GB</memory>
          <!--<vm-template nameref="windowsTemplate" /> -->
       </vm-cluster>
    </vm-clusters>
    <services>
       <service name="FileServerService">
          <vm-cluster nameref="fileServerVM" />
          <service-type nameref="FileServerService" />
          <version>
             <name>1.0</name>
          </version>
          <os-info family="Windows" architecture="x64" />
          <dependencies />
          <endpoints>
             <endpoint name="dataAccess">
       <object-type uid="com.emc.xms.resources.catalog.Endpoint"
name="Endpoint"/>
       <endpoint-type deleted="false" nameref="DataAccess"/>
       <configuration vmIndex="0" master="false">
          <property value="\\DCMFV31-VK.clouddc.blr.com\globalShare"
name="unc.path"/>
       </configuration>
       <system-account-binding nameref="WINDOWS_TEMPLATE">
          <system-account deleted="false"/>
       </system-account-binding>
    </endpoint>
 </endpoints>
 <service-components>
    <service-component name="FileServer">
       <service-component-type nameref="FileServerType" />
       <properties>
          <property name="share.name" value="globalShare"
/>
          <property name="share.capacity" value="50" />
       </properties>
    </service-component>
 </service-components>
</service>
<service name="RepositoryService">
   <vm-cluster nameref="repoVM" />
   <service-type nameref="RepositoryService" />
   <version>
      <name>7.0</name>
   </version>
   <os-info family="Windows" architecture="x64" />
   <dependencies>
      <dependency name="repositoryDbConfig">
         <endpoint-type nameref="DatabaseAccess" />
      </dependency>
      <dependency name="smtpConfig">
         <endpoint-type nameref="SMTPEndpoint" />
      </dependency>
      <dependency name="emailNotificationConfig">
         <endpoint-type nameref="EmailNotificationEndpoint" />
      </dependency>
      <dependency name="dataAccess" optional="false">
         <local-endpoint nameref="dataAccess" />
         <endpoint-type nameref="DataAccess" />
      </dependency>
   </dependencies>
   <endpoints>
      <endpoint name="repositoryEndpoint">
   <object-type uid="com.emc.xms.resources.catalog.Endpoint"
name="Endpoint"/>
   <endpoint-type deleted="false" nameref="RepositoryAccess"/>
   <configuration vmIndex="0" master="false">
      <property value="doc_VK1" name="docbase.name"/>
      <property value="DCMRV31-VK.clouddc.blr.com"
name="docbroker.host/>
      <property value="1489" name="docbroker.port"/>
      <property value="dm_bof_registry" name="bof.registry.user.name"/>
      <property value="mydoc_VK1" name="docbase.owner.name"/>
      <property value="domusr1" name="install.owner"/>
      <property
value="T9qFhVOeMm0QwePN8h79mJmuH1aNIxbpWIZ4Zyk2kso="
         name="secure.install.owner.password"/>
   </configuration>
   <system-account-binding>
```

TABLE A-continued

```
      <system-account nameref="WINDOWS TEMPLATE"/>
   </system-account-binding>
</endpoint>
   </endpoints>
   <service-components>
      <service-component name="ContentServer">
         <service-component-type nameref="ContentServerType" />
         <!-- comment: This component configuration provided as input the
xMS specifies the installation / configuration properties associated
with the software component such as install location, ports, memory
setting, etc. Monitoring system like Hyperic also require such kind of
details to detect the software component and start monitoring the same.
The resource template defines, how blueprint inventory gets
transformed into the monitoring configuration-->
         <properties>
            <property name="appserver.http.port"
value="9080" />
            <property name="appserver.base.port"
value="9180" />
            <property name="appserver.jvm.opts" value="-
Xms512m -Xmx1024m -XX:PermSize=64m -XX:MaxPermSize=256m -
Xss256k -XX:+DisableExplicitGC -Xrs" />
            <property name="docbroker.port" value="1489" />
            <property name="docbase.name" value="akkD88"
/>
            <property name="docbase.id" value="18388" />
            <property name="docbase.owner.name"
value="documentum" />
            <property name="common.server.licensing"
value="false" />
            <property name="tcs.license.key"
value="ABSSERIAL" />
            <property name="dms.webservices.listen.port"
value="8489" />
            <property name="server.conf.distributed.env"
value="false" />
            <property name="install.external.docbroker"
value="true" />
         </properties>
      </service-component>
   </service-components>
</service>
  </services>
</blueprint>
```

The example of the blueprint file shown in table A above defines a topology of an environment. The data in the blueprint file shows that the topology includes two services and two compute nodes. A first service includes a repository service. A second service includes a file server service. The repository service is dependent on the file server service. The repository service has one service component defined. The service component corresponds to software components running on the compute nodes (virtual/physical) to provide repository service to the end user. Each and every service may have one or more end points associated with the same. The end points define the end points the end users or consumer applications hit so as to consume the services provided by the respective service. This example of the blueprint includes a component configuration that specifies the installation and configuration properties associated with the software component such as install location, ports, memory setting, and so forth. Some monitoring systems, such as Hyperic, require these details to detect the software component and start monitoring the same.

In a step 815, a resource template specifying an inventory model of an application monitoring program is created and stored. The resource template defines how blueprint inventory is transformed into the monitoring configuration required by the monitoring application program (e.g., resource definitions in the inventory of the monitoring application program). Table B below shows an example of a template file.

TABLE B

```xml
<monitoring-resource-template>
<monitoring-configuration type="repositoryService" version="7.0">
  <hyperic-group type="Content Server Compatible Group" category="Compatible Group"
naming-policy="content-server-compatible-group-policy">
    <members>
     <member type="Documentum Content Server"/>
    </members>
  </hyperic-group>
  <hyperic-group type="Repository Group" category="Mixed Group">
   <members>
    <member type="Content Server Group"/>
    <member type="xxxxx"/>
    </members>
  </hyperic-group>
<monitoring-configuration type="contentServer" version="7.0">
 <hyperic-group type="Content Server Group" category="Mixed Group" naming-
policy="content-server-mixed-group-policy">
  <members>
     <member type="Documentum Content Server"/>
     <member type="ACS Server"/>
     <member type="Documentum Java Method Server"/>
      </members>
  </hyperic-group>
   <hyperic-group type="JMS Group" category="Compatible Group" naming-policy="JMS-
group-naming-policy">
    <members>
     <member type="Documentum Java Method Server"/>
      </members>
  </hyperic-group>
   <hyperic-server-component type="Documentum Content Server" naming-policy="content-
server-naming-policy">
    <properties>
     <property name="repositoryName" value="${docbase.name}"/>
     <property name="contentServerName" value="${contentserver.name}"/>
     <property name="userName" value="${docbase.owner.name}"/>
     <property name="password" value="${docbase.endpoint.password}"/>
     <property name="docbroker.port" value="${docbroker.port}"/>
     <property name="docbroker.host" value="${docbrokerhost}"/>
    </properties>
    <metrics>
     <metric name="CPU Usage" units="Percentage" type="" threshold="xxxx" threshold-
type="LOWER/UPPER/AVG"/>
     <metric name="Process Cpu Total Time" units="ms" threshold="xxxx" threshold-
type="LOWER/UPPER/AVG" />
      </metrics>
    </hyperic-server-component>
   <hyperic-server-component type="ACS Server">
       <!--- Similar to that of the content server -->
    </hyperic-server-component>
</monitoring-configuration>
<monitoring-configuration type="Documentum Docbroker" version="*" >
<hyperic-server-component type="Documentum Docbroker" naming-policy="docbroker-
naming-policy">
   <properties>
    <property name="docbrokerName" value="${docbroker.name}"/>
   </properties>
    <metrics>
    <metric name="CPU Usage" units="Percentage" type="" threshold="xxxx" threshold-
type="LOWER/UPPER/AVG"/>
    <metric name="Process Cpu Total Time" units="ms" threshold="xxxx" threshold-
type="LOWER/UPPER/AVG" />
      </metrics>
</hyperic-server-component>
</monitoring-configuration>
</monitoring-configuration>
</monitoring-resource-template>
```

The example of the resource template shown in table B is based on the Hyperic inventory model. In a specific implementation, the monitoring resource template defines how a blueprint associated with an xMS provisioned environment gets transformed into monitoring configuration (resources definitions in inventory of monitoring systems such as Hyperic). Hyperic has an inventory hierarchy it maintains, every resource running in the context of OS can be mapped to Hyperic Server, and a Hyperic server can have multiple Hyperic services. These server and service resources can be grouped using Hyperic group objects (e.g., hyperic-group, hyperic-server and hyperic-service elements).

In this specific implementation, the naming-policy in the resource template declares the naming policy that needs to be applied in naming the resource in the Hyperic inventory. The type attribute defines the type of the service/service component in the blueprint. The version attribute determines the version of the component/service. The ways the resources are configured for monitoring may vary from version to version. The metrics element defines the monitoring metrics associated with the resource type in the Hyperic inventory. These metrics can be enabled or disabled on an as-needed basis.

In a specific implementation, the template file includes XML tags. In another specific implementation, the template file may instead or additionally include business logic that defines transformation or mapping logic to map the blueprint configuration to a monitoring configuration.

In a step 820, the tool receives the blueprint and template files. The tool may provide a graphical user interface that allows an administrator to browse and upload or import the files into the tool.

In a step 825, the tool reads, parses, or analyzes the blueprint and template files in order to configure the resources for monitoring. In particular, the tool configures the set of resources defined in the blueprint according to the inventory model specified in the template to permit the application monitoring program to monitor the set of resources during execution of the distributed application program.

Figure 9:
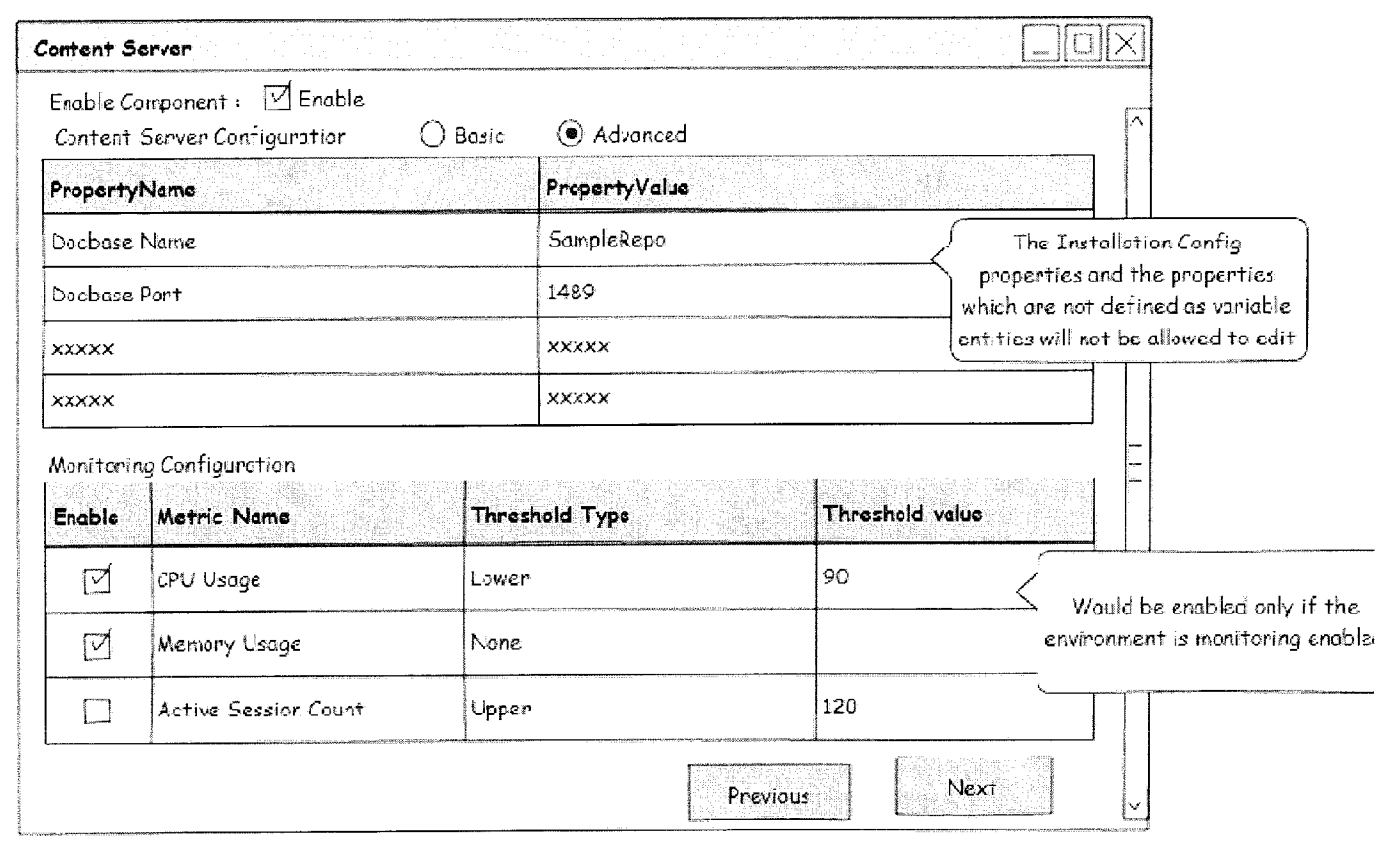

Configuring a resource may include categorizing or classifying the resource, grouping the resource, naming or labeling the resource, identifying an install location, identifying a port on which the resource will be running, identifying a type of the resource, specifying a communication protocol (e.g., Hypertext Transfer Protocol Secure (HTTPS) or Hypertext Transfer Protocol (HTTP)), enabling or disabling a metric (e.g., CPU usage (e.g., amount of CPU a resource is consuming), memory usage (e.g., amount of memory space a resource is consuming), active session count, active user count, or database table size), setting a threshold type for the metric (e.g., lower threshold type or upper threshold type), setting a threshold value, specifying a name of the metric to be displayed in a graphical user interface, specifying a category of metric (e.g., availability, throughput, performance, or utilization), specifying the units of measurement of the metric (e.g., none, percentage, bytes, kilobytes, megabytes, gigabytes, terabytes, epoch-millis, epoch-seconds, nanoseconds, microseconds, milliseconds, jiffies, seconds, or cents), specifying a collection interval of the metric (e.g., 1 minute, 5 minute, 10 minutes, or 30 minutes), specifying a time period for a rate of measurement (e.g., one second, one minute, or one hour), specifying a frequency of metric collection—just to name a few examples. FIG. 9 shows an example of a user interface displaying configuration parameters and corresponding values for a content server resource.

In a specific implementation, a template file acts as a bridge or map to describe relationships between a resource as specified in the blueprint file and how the resource should be specified in the inventory model of the monitoring application program. The template file may include categories, properties, attributes, settings, values, metadata, or combinations of these that are to be associated with a resource, not specified in the blueprint file, but required by the monitoring application program. The template and blueprint files may be read. Based on the reading of the files, configuration information may be generated and provided to the application monitoring program. The application monitoring program may use the configuration information to detect the resource so that it can be monitored. The template may include mapping information, mapping tables, rules, or combinations of these that describe how a blueprint configuration is mapped or transformed to a monitoring configuration.

In another specific implementation, a method includes receiving a blueprint file including a listing of resources defined according to a first data model, receiving a template file including a set of resource categories according to a second data model, information mapping a resource from the listing of resources to a resource category, and a metric to be associated with the resource, and based on the template file, configuring resources listed in the listing of resources, where the second data model is different from the first data model. The first data model may be associated with an environment provisioning system. The second data model may be associated with a resource monitoring program. The blueprint and template file may be stored in an XML format.

The tool may further update an inventory of the monitoring application based on resource changes. For example, during the lifetime of a resource (e.g., a software resource component), there may be changes such as the addition of a new node (e.g., new application server node) during a scaling operation, creation of a cluster of nodes, changes to database access credentials (e.g., changing a username, password, or both of a database that an application is accessing), removal of an existing node, changes to configuration parameters, and the like. It is desirable that resource configuration changes in an environment be reflected in the inventory of the monitoring application so that the newly changed resource can be monitored. For example, in the case of database access credentials being changed, it can be desirable that the monitoring application be made aware of these changes so that the monitoring application can use the new access credentials in order to continuing probing the database for table size, activity around various tables, and so forth.

In an implementation, the tool can identify resource changes, such as via a new or updated blueprint file, and update the inventory accordingly (e.g., add a new resource to the inventory, or update a parameter of an existing resource in the inventory). For example, the new blueprint file may include new database access credentials. In a specific implementation, the tool may periodically check for changes so that the monitoring configuration will be in sync with the environment configuration. Checks may be performed hourly, daily, weekly, or at any time interval as desired.

As discussed above, in a specific embodiment, the tool is implemented in an xMS provisioned environment. The environment includes a collection of software components installed and configured on a cloud infrastructure (e.g., vSphere/vCloud) as per the topology and configuration requirements laid out by the blueprint configuration.

At a high level an xMS provisioned environment includes a collection of compute nodes (e.g., virtual machines), where each virtual machine hosts one or more services, which render services thru the service end points. Each service includes a collection of software components that work together to render a specific service. The software component as well as compute node can be referred to as resources combined together to render some kind of service to the consumer, where resources have resource type associated. Every resource based on the type of the resource may include a set of configuration parameters associated with them that drive the run time behavior of resource.

The blueprint configuration encapsulates the details of the resources associated with the environment and the topology of the system. This may include the connectivity or dependency between the components, and other configuration data. Thus, the blueprint configuration becomes a first hand descriptor describing aspects of an environment. For environments that have been provisioned using xMS, blueprints associated with environments may be persisted in the catalog (catalog may be an XML database).

In a specific implementation, configuring an xMS provisioned environment for monitoring involves in mapping the resources (compute nodes and software components) in the environment to a Hyperic inventory by creating a resource of appropriate resource prototype in the Hyperic inventory and grouping the resources such that it maps the service or service component hierarchy defined by the environment blueprint. As each and every service or software component may have a type in the xMS catalog, each and every resource may have a resource prototype in the Hyperic inventory. Resource type and resource prototype identify the type of the resource, and define the set of configuration parameters required for successfully monitoring the resource.

In this specific implementation, a technique includes mapping of the resources from xMS catalog (Blueprint associated with provisioned environment) to Hyperic inventory in two phases. A first phase includes Hyperic Resource Inventory Building. A second phase includes Hyperic Resource Inventory Synchronization.

Figure 10:
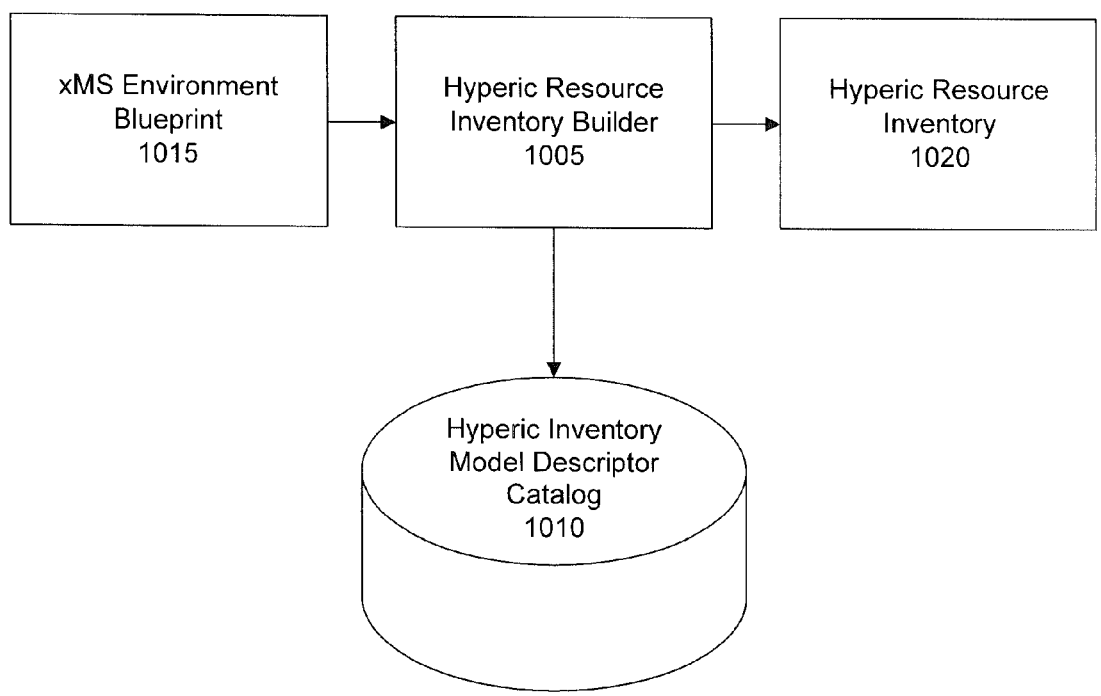
FIG. 10 shows a block diagram of a specific implementation of a tool for use with the Hyperic Monitoring and Documentum application programs.

More particularly, in this specific implementation, during the first phase (Hyperic Resource Inventory Building) an inventory of Hyperic resource definitions will be created corresponding to the resources in the xMS provisioned environment. A Hyperic inventory configuration builder 1005 (FIG. 10) builds the Inventory of Hyperic resources 1020 by taking the environment blueprint 1015 and Hyperic inventory model descriptor/Hyperic inventory resource templates 1010 as inputs. The Hyperic Inventory Model Descriptor Catalog is an entity (e.g., storage) that stores the Hyperic Inventory Resource Templates. As discussed above, the blueprint associated with the xMS provisioned environment defines the environment topology and captures information regarding the software components installed in the context of the environment such as type of the software components (resources), configuration parameters that define the run time behavior, connectivity details and access credentials, and component dependencies.

In this specific implementation, the Hyperic Inventory Model Descriptor/Hyperic Inventory Resource Template provides information regarding how a specific resource can be represented in Hyperic Inventory and metrics that need to be enabled for a specific resource. That is, it describes the resources in the way the resource needs to be represented in Hyperic. Hyperic Resource Inventory Configuration Builder builds the inventory of Hyperic resources by translating the software component definitions in the blueprint to a Hyperic inventory resource, based on the rules defined in Hyperic Inventory Model Descriptor/Hyperic Inventory Resource Template. The collection of Hyperic Inventory Model Descriptors/Hyperic Inventory Resource Templates corresponding to different resource types may be stored in the Hyperic Inventory Model/Resource Template Catalog. The inventory of Hyperic resources built by Hyperic Inventory Builder forms the first class representation of resources that can be directly mapped to Hyperic inventory.

Figure 11:
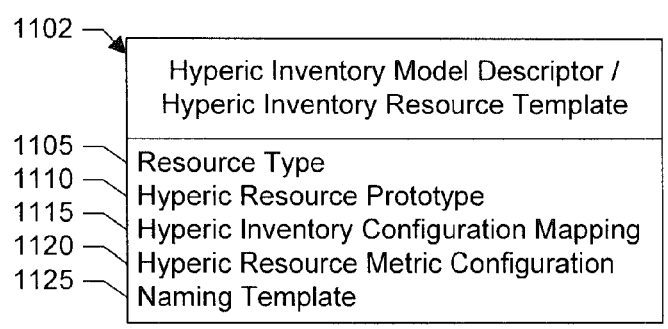
FIG. 11 shows an example of a template for the specific implementation of the tool shown in FIG. 10.

In this specific implementation, the Hyperic Inventory Model Descriptor/Hyperic Inventory Resource Template, defines how a resource a resource definition in a blueprint associated with the xMS provisioned environment gets mapped into the Hyperic inventory resource. FIG. 11 lists the fields that may be included in a template 1102 in this specific implementation of the tool. As shown in FIG. 11, there is a first field 1105 labeled resource type, a second field 1110 labeled Hyperic Resource Prototype, a third field 1115 labeled Hyperic Inventory Configuration Mapping, a fourth field 1120 labeled Hyperic Resource Metric Configuration, and a fifth field 1125 labeled Naming Template.

In this specific implementation, resource type 1105 identifies the type of the resource in the xMS provisioned environment. Every software component that may be provisioned thru xMS may have a resource type associated with the same, that identifies the type of the software component. The Hyperic Resource prototype can define the type of the resource in the Hyperic inventory. Every resource in the Hyperic inventory may have a resource prototype associated with it. The Hyperic Inventory Configuration Mapping defines how configuration parameters in the resource definition associated with the blueprint map to the resource definition in the Hyperic inventory. The Hyperic Resource Metric Configuration captures the details regarding the metrics that should be enabled/disabled. An example includes the metric collection interval that may be associated with each metric. The Naming template defines how a resource is named in the Hyperic inventory.

Figure 12:
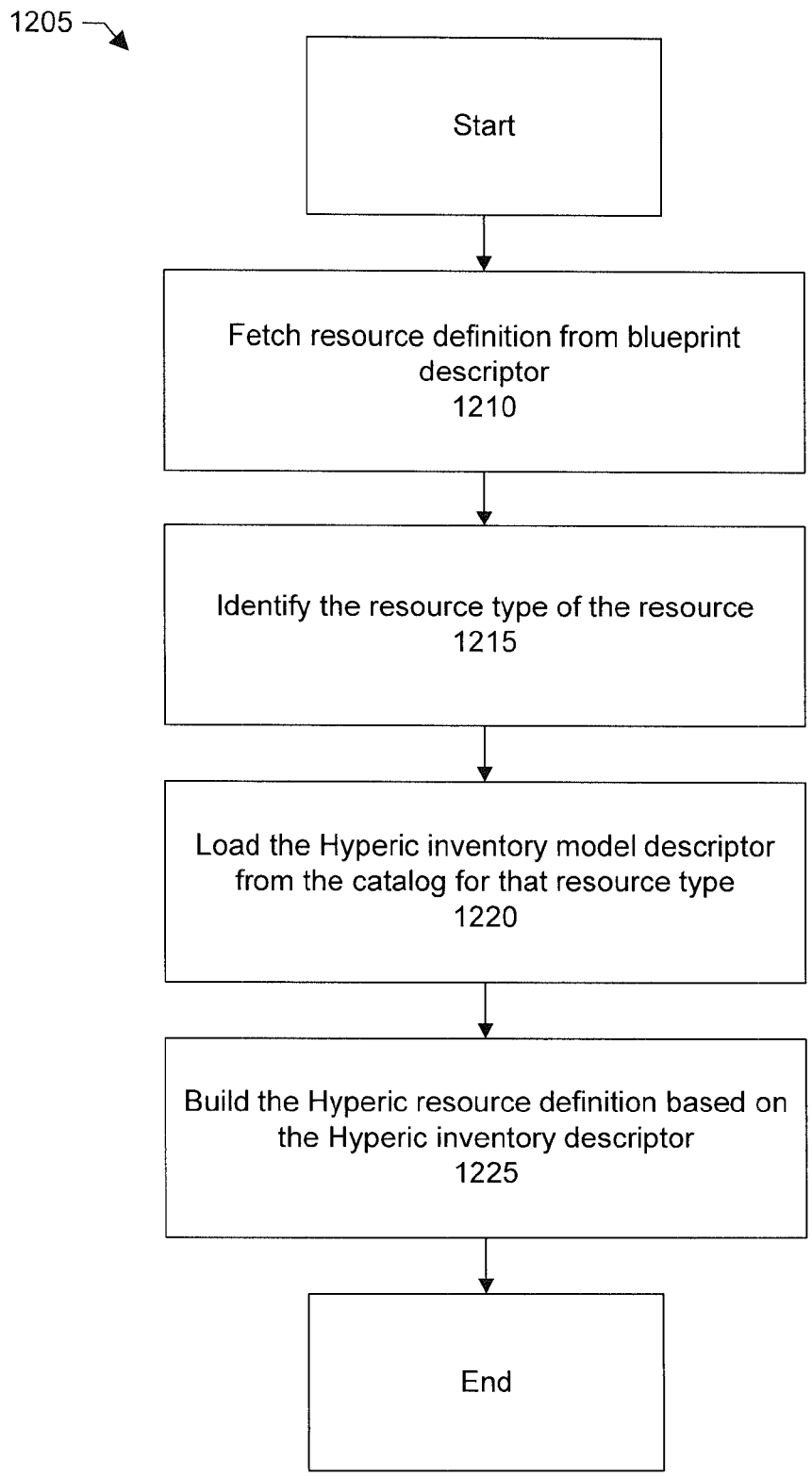
FIG. 12 shows a flow for the specific implementation of the tool shown in FIG. 10.

FIG. 12 shows a flow 1205 for building a resource inventory in a specific implementation. In a step 1210, the builder tool fetches a resource definition from the blueprint descriptor. In a step 1215, the builder tool identifies the resource type of the resource. In a step 1220, the builder tool loads the Hyperic inventory model descriptor from the catalog for the resource type. In a step 1225, the builder tool builds the Hyperic resource definition based on the Hyperic inventory model descriptor.

Figure 13:
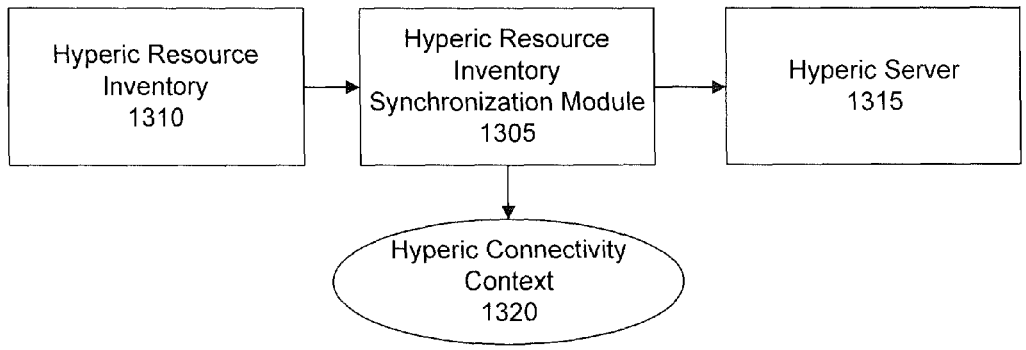
FIG. 13 shows a block diagram of a synchronization module of the specific implementation of the tool shown in FIG. 10.

FIG. 13 shows a block diagram of a module 1305 for synchronizing the resource inventory in a specific implementation. The module can be a component of the builder tool. In this specific implementation, once the Hyperic Resource Inventory 1310 has been successfully built the Hyperic resource inventory synchronization service 1305 synchronizes the inventory of Hyperic resources in a Hyperic server 1315. Hyperic Connectivity Context 1320 includes the connectivity details of the Hyperic monitoring server, such as server IP/host name and user credentials to login to the Hyperic server so as to create the inventory. Synchronization can include a combination of creating resources and updating resources. Hyperic has capability of auto detection of resources, once the Hyperic agent has been successfully configured on VM/physical machine; it sends the list of auto discovered resources. Though the resource has been successfully auto discovered, typically the resources require manual intervention in successfully configuring them for monitoring by supplying the parameters such as access credentials, and others. A feature of the invention automatically configures the resources for monitoring so as to reduce or eliminate the need for manual intervention.

Figure 14:
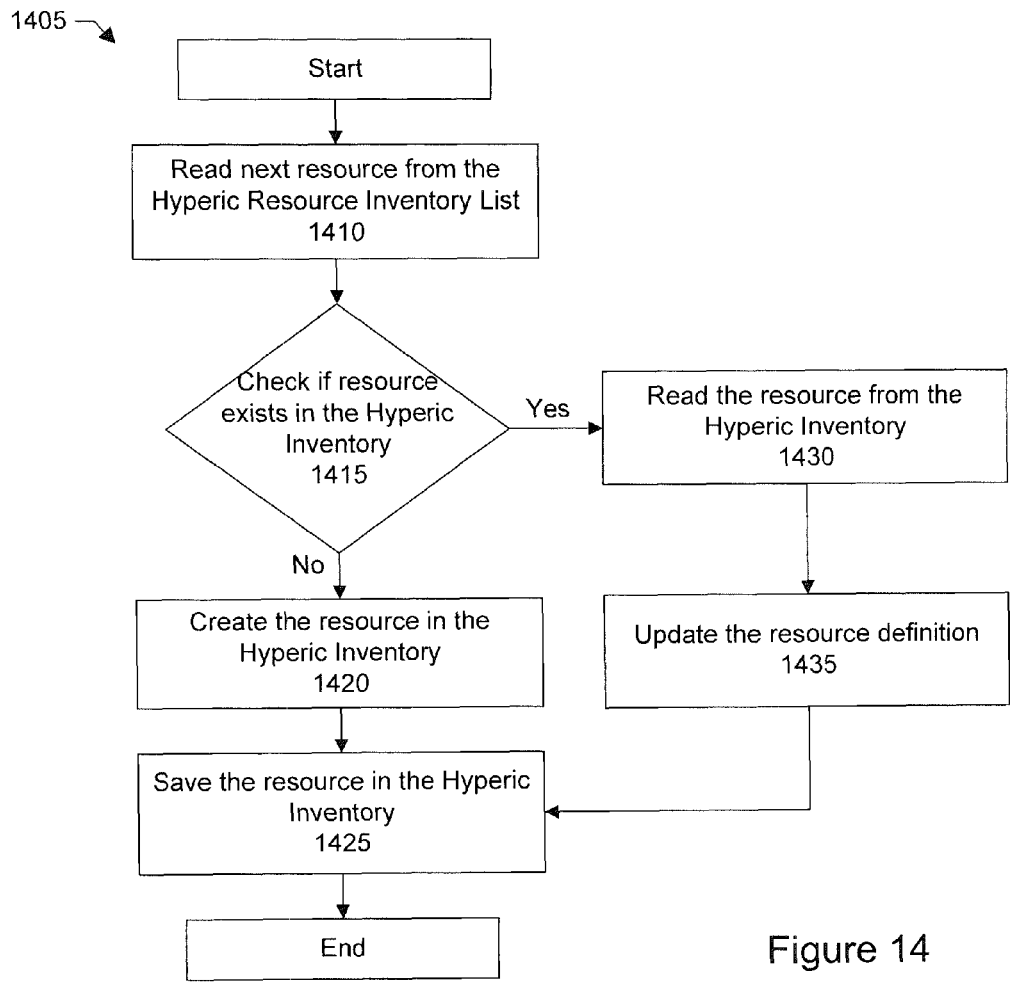
FIG. 14 shows a flow of a specific implementation of synchronizing.

FIG. 14 shows a flow 1405 for synchronization. In a step 1410, the builder tool reads a next resource from the Hyperic resource inventory list. In a step 1415, the builder tool determines or checks whether the resource exists in the Hyperic Inventory. If the resource does not exist in the Inventory, the builder tool creates the resource in the Hyperic inventory (step 1420) and saves the resource in the Hyperic Inventory (step 1425).

Alternatively, if the resource does exist in the Inventory, in a step 1430 the builder tool reads the resource from the Hyperic Inventory. In a step 1435, the builder tool updates the resource definition and saves the resource in the Hyperic Inventory (step 1425).

In a specific implementation, determining whether a resource definition in an inventory should be updated includes comparing a definition of a resource as defined in a blueprint file with a corresponding definition of the resource as defined in the inventory, if the definition and corresponding definition match, determining that the corresponding definition does not need to be updated, and if the definition and the corresponding definition do not match, determining that the corresponding definition does need to be updated. The updating may include adding at least a portion of the information in the definition to the corresponding definition, replacing at least a portion of the information in the corresponding definition with at least a portion of information in the definition, deleting or removing at a least a portion of information in the corresponding definition, editing, modifying, changing, or altering at least a portion of information in the corresponding definition, or combinations of these.

The systems and techniques described in this patent application can help to ensure that the resource inventory in the Hyperic server is in line to the updates that happen to the software components over the life time of the deployment, by scheduling the execution of the Hyperic inventory building and Hyperic inventory synchronization tasks based on the user defined schedule.

Benefits of the system include 1) a mechanism that integrates Hyperic and Documentum deployments for monitoring with Hyperic, 2) an automated and model driven configuration of environment monitoring, that automatically configures the Documentum deployments for monitoring in context of cloud, 3) monitoring inventory resource template definition, that defines how a resource can be configured for monitoring, rule driven monitoring configuration and rule driven naming of resources in Hyperic inventory, and 4) a synchronization mechanism that can be scheduled to ensure that inventory in monitoring system is in line with the environment. This patent application describes configuring resources for monitoring by Hyperic. It should be appreciated, however, that aspects and principles of the technique can be applied to any monitoring system.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
receiving a template specifying an inventory model of an application monitoring program;
receiving a blueprint for a distributed application program, the blueprint comprising a description of a deployment topology of an established computing environment associated with the distributed application program and information defining a plurality of resources to support execution of the distributed application program, the distributed application program executing on the established computing environment;
adjusting a configuration of the plurality of resources defined in the blueprint according to the inventory model specified in the template to permit the application monitoring program to monitor the plurality of resources during execution of the distributed application program; and
monitoring the distributed application program by the application monitoring program while the plurality of resources are supporting the execution of the distributed application program, the monitoring being based on the adjusted configuration.

2. The method of claim 1, the adjusting the configuration further comprising:
mapping a type of resource defined in the blueprint to a type of resource specified in the inventory model of the application monitoring program.

3. The method of claim 1 wherein the blueprint identifies a first service, a second service, and a dependency between the first and second service.

4. The method of claim 1 wherein the blueprint identifies one or more of a number of computing nodes in the computing environment, software components required for the computing environment, a mapping of the software components to the computing nodes, or configuration options associated with the software components.

5. The method of claim 1 wherein the template declares a naming policy for naming a resource to be monitored by the application monitoring program.

6. The method of claim 1 wherein a file format of the template and the blueprint comprises Extensible Markup Language (XML).

7. The method of claim 1 wherein the adjusting the configuration of the plurality of resources comprises:
enabling a metric associated with a resource, wherein the metric is specified in the template.

8. The method of claim 1 wherein the adjusting the configuration of the plurality of resources comprises:
classifying a resource into a category, wherein the resource is listed in the blueprint and the category is listed in the template.

9. A computer program product, comprising a non-transitory computer-readable medium having a computer-readable program code embodied therein, the computer-readable program code adapted to be executed by one or more processors to implement a method comprising:
receiving a template specifying an inventory model of an application monitoring program;
receiving a blueprint for a distributed application program, the blueprint comprising a description of a deployment topology of an established computing environment associated with the distributed application program and information defining a plurality of resources to support execution of the distributed application program, the distributed application program executing on the established computing environment;
adjusting a configuration of the plurality of resources defined in the blueprint according to the inventory model specified in the template to permit the application monitoring program to monitor the plurality of resources during execution of the distributed application program; and
monitoring the distributed application program by the application monitoring program while the plurality of resources are supporting the execution of the distributed application program, the monitoring being based on the adjusted configuration.

10. The computer program product of claim 9 wherein the adjusting the configuration further comprises:
mapping a type of resource defined in the blueprint to a type of resource specified in the inventory model of the application monitoring program.

11. The computer program product of claim 9 wherein the blueprint identifies a first service, a second service, and a dependency between the first and second service.

12. The computer program product of claim 9 wherein the blueprint identifies one or more of a number of computing nodes in the computing environment, software components required for the computing environment, a mapping of the software components to the computing nodes, or configuration options associated with the software components.

13. The computer program product of claim 9 wherein the template declares a naming policy for naming a resource to be monitored by the application monitoring program.

14. The computer program product of claim 9 wherein a file format of the template and the blueprint comprises Extensible Markup Language (XML).

15. The computer program product of claim 9 wherein the adjusting the configuration of the plurality of resources comprises:
   enabling a metric associated with a resource, wherein the metric is specified in the template.

16. A system for configuring resources for monitoring, the system comprising:
   a processor-based database management system executable on a computer system, the computer system having one or more processors and a non-transitory computer-readable medium storing a plurality of instructions, which when executed, cause the one or more processors to:
      receive a template specifying an inventory model of an application monitoring program;
      receive a blueprint for a distributed application program, the blueprint comprising a description of a deployment topology of an established computing environment associated with the distributed application program and information defining a plurality of resources to support execution of the distributed application program, the distributed application program executing on the established computing environment;
      adjust a configuration of the plurality of resources defined in the blueprint according to the inventory model specified in the template to permit the application monitoring program to monitor the plurality of resources during execution of the distributed application program; and
      monitor the distributed application program by the application monitoring program while the plurality of resources are supporting the execution of the distributed application program, the monitoring being based on the adjusted configuration.

17. The system of claim 16 wherein the adjusting the configuration further comprises:
   mapping a type of resource defined in the blueprint to a type of resource specified in the inventory model of the application monitoring program.

18. The system of claim 16 wherein the blueprint identifies a first service, a second service, and a dependency between the first and second service.

19. The system of claim 16 wherein the blueprint identifies one or more of a number of computing nodes in the computing environment, software components required for the computing environment, a mapping of the software components to the computing nodes, or configuration options associated with the software components.

20. The system of claim 16 wherein the template declares a naming policy for naming a resource to be monitored by the application monitoring program.

* * * * *